United States Patent
Zhou

(10) Patent No.: US 11,861,621 B2
(45) Date of Patent: Jan. 2, 2024

(54) PAYMENT RISK CONTROL METHOD AND SYSTEM

(71) Applicant: Advanced New Technologies Co., Ltd., Grand Cayman (KY)

(72) Inventor: Xuedong Zhou, Zhejiang (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 34 days.

(21) Appl. No.: 17/104,923

(22) Filed: Nov. 25, 2020

(65) Prior Publication Data

US 2021/0081951 A1 Mar. 18, 2021

Related U.S. Application Data

(63) Continuation of application No. PCT/CN2019/092491, filed on Jun. 24, 2019.

(30) Foreign Application Priority Data

Aug. 20, 2018 (CN) .......................... 201810950368.2

(51) Int. Cl.
*G06Q 20/40* (2012.01)
*G06Q 20/32* (2012.01)

(52) U.S. Cl.
CPC ..... *G06Q 20/4016* (2013.01); *G06Q 20/3224* (2013.01); *G06Q 20/3274* (2013.01); *G06Q 20/3276* (2013.01); *G06Q 20/3278* (2013.01)

(58) Field of Classification Search
CPC .......... H04W 12/77; G06Q 20/3274–20/3276; G06Q 20/3224; G06Q 2240/00;

(Continued)

(56) References Cited

U.S. PATENT DOCUMENTS 8,924,292 B1 * 12/2014 Ellis ..................... G06K 7/1413
705/41
10,163,105 B1 * 12/2018 Ziraknejad ......... G06Q 20/3274
(Continued)

FOREIGN PATENT DOCUMENTS

| CN | 203746126 U | 7/2014 |
| CN | 106296293 A | 1/2017 |

(Continued)

OTHER PUBLICATIONS

International Search Report PCT/CN2019/092491, dated Sep. 24, 2019. (Year: 2019).*

(Continued)

*Primary Examiner* — Jay Huang
(74) *Attorney, Agent, or Firm* — Finnegan, Henderson, Farabow, Garrett & Dunner, LLP

(57) ABSTRACT

A method for payment risk control includes: receiving a request for payment graphic code generation from a mobile terminal device, the request carrying preset risk control features, the risk control features including a payment account feature of an account, a current location feature, and a station entering and exiting feature; obtaining pre-stored historical risk control features of the account according to the payment account feature in the request; detecting whether there is a transaction risk for the mobile terminal device by comparing the obtained historical risk control features with the risk control features carried in the request; and sending a risk control detection result to the mobile terminal device to generate and display a payment graphic code.

9 Claims, 10 Drawing Sheets

(58) Field of Classification Search
CPC ....... G06Q 20/4016; G06Q 20/38–425; G06Q 20/32–3274; G06Q 20/3278
See application file for complete search history.

(56) References Cited

U.S. PATENT DOCUMENTS

| | | | | |
|---|---|---|---|---|
| 10,853,787 | B1* | 12/2020 | Mango | G06Q 20/105 |
| 11,062,300 | B1* | 7/2021 | Sridharan | G06Q 10/025 |
| 2010/0252624 | A1* | 10/2010 | Van de Velde | G06Q 20/3827 235/382 |
| 2013/0030931 | A1* | 1/2013 | Moshfeghi | H04W 4/80 705/16 |
| 2013/0085941 | A1* | 4/2013 | Rosenblatt | G06Q 20/1085 705/44 |
| 2013/0151405 | A1* | 6/2013 | Head | G06Q 20/36 705/41 |
| 2014/0244409 | A1* | 8/2014 | Nathanel | G06Q 30/02 705/15 |
| 2015/0227923 | A1* | 8/2015 | Kutsch | G07C 9/257 705/67 |
| 2016/0042333 | A1* | 2/2016 | Ho | H04W 4/029 705/41 |
| 2016/0042344 | A1* | 2/2016 | Thimmana | G06Q 20/3672 705/41 |
| 2016/0078445 | A1* | 3/2016 | Einhorn | G06Q 20/325 705/44 |
| 2017/0091754 | A1* | 3/2017 | Silbernagl | G06Q 20/0655 |
| 2017/0193498 | A1* | 7/2017 | Metral | G06Q 20/326 |
| 2017/0213205 | A1* | 7/2017 | Sinai | G06Q 20/3276 |
| 2017/0243262 | A1* | 8/2017 | Pan | G07B 15/06 |
| 2017/0278325 | A1* | 9/2017 | Simanek | G06Q 20/349 |
| 2018/0047016 | A1* | 2/2018 | Sarin | G06Q 20/3674 |
| 2018/0300961 | A1* | 10/2018 | Muller | G06Q 30/0261 |
| 2019/0279326 | A1 | 9/2019 | Chen et al. | |
| 2020/0175496 | A1* | 6/2020 | Finke | G06Q 20/209 |
| 2021/0150824 | A1* | 5/2021 | Goel | G06Q 20/3229 |

FOREIGN PATENT DOCUMENTS

| | | | | |
|---|---|---|---|---|
| CN | 106846506 | A | | 6/2017 |
| CN | 107516210 | A | | 12/2017 |
| CN | 107578238 | A | | 1/2018 |
| CN | 108364132 | A | | 8/2018 |
| GB | 2544511 | A | * 5/2017 | ........... G06Q 20/145 |
| KR | 20130009890 | A | | 1/2013 |
| WO | WO 2018/137622 | A1 | | 8/2018 |

OTHER PUBLICATIONS

"Mobile Signal Strength Recommendations." Teltonika Wiki Knowledge Base. Revision as of 16:02, Nov. 10, 2017 by Dziugas. https://wiki.teltonika-networks.com/index.php?title=Mobile_Signal_Strength_Recommendations&oldid=1745 (Year: 2017).*

L. Finžgar and M. Trebar, "Use of NFC and QR code identification in an electronic ticket system for public transport," SoftCOM 2011, 19th International Conference on Software, Telecommunications and Computer Networks, Split, Croatia, 2011, pp. 1-6, 3. (Year: 2011).*

"RSSI values for good/bad signal strength." Juniper Networks Documentation: FAQ. Apr. 6, 2021 (available at https://www.mist.com/documentation/rssi-values-good-bad-signal-strength/) (Year: 2021).*

European Search Report in European Application No. 19850892.1, dated May 4, 2021.

Written Opinion in Singapore Application No. 11202010660P, dated Jun. 29, 2022.

International Search Report in Application No. PCT/CN2019/092491, from the China National Intellectual Property Administration (ISA/CN), dated Sep. 24, 2019.

Written Opinion of the International Search Authority in International Application No. PCT/CN2019/092491, dated Sep. 24, 2019.

* cited by examiner

PAYMENT RISK CONTROL METHOD AND SYSTEM

CROSS-REFERENCE TO RELATED APPLICATIONS

This application is a continuation application of International Application No. PCT/CN2019/092491, filed on Jun. 24, 2019, which is based upon and claims priority to Chinese Patent Application No. 201810950368.2, filed on Aug. 20, 2018, the entire content of all of which is incorporated herein by reference.

TECHNICAL FIELD

Embodiments of the present specification relate to the technical field of Internet applications, and in particular, to a payment risk control method and system.

BACKGROUND

With the development of smart terminals and the popularization of network applications, a user can implement various payment operations through an application client with a payment function installed on a terminal. For example, when using public transportation such as buses and subways, the user can use a client of an electronic wallet to pay transportation fees. However, for users and payment institutions, there may be risks such as account thefts and deduction failures.

Based on the prior art, a payment risk control solution for a scenario of electronic payment of public transportation fees is needed.

SUMMARY

According to a first aspect of embodiments of the present specification, there is provided a method for payment risk control. The method includes: receiving a request for payment graphic code generation from a mobile terminal device, the request carrying preset risk control features, the risk control features including a payment account feature of an account, a current location feature, and a station entering and exiting feature; obtaining pre-stored historical risk control features of the account according to the payment account feature in the request; detecting whether there is a transaction risk for the mobile terminal device by comparing the obtained historical risk control features with the risk control features carried in the request; and sending a risk control detection result to the mobile terminal device to generate and display a payment graphic code. Detecting whether there is a transaction risk may include: determining whether a payment graphic code to be generated is used for station entering or station exiting according to the station entering and exiting feature; if it is determined that the payment graphic code to be generated is used for station entering, determining whether a frequency of the request for payment graphic code generation is higher than a preset threshold, and if so, determining that there is a transaction risk; and if it is determined that the payment graphic code to be generated is used for station exiting, determining whether the current location feature in the request for payment graphic code generation and a corresponding station entering location feature in the historical risk control features meet a preset location relation condition, and if not, determining that there is a transaction risk.

According to a second aspect of embodiments of the present specification, there is provided an apparatus for payment risk control. The apparatus includes a processor; and a memory storing instructions executable by the processor, wherein the processor is configured to perform the method for payment risk control according to the first aspect.

According to a third aspect of embodiments of the present specification, there is provided a non-transitory computer-readable storage medium having stored thereon instructions that, when executed by a processor of an apparatus, cause the apparatus to perform the method for payment risk control according to the first aspect.

According to a fourth aspect of embodiments of the present specification, there is provided a method for payment risk control. The method includes: after receiving trigger of a station entering and exiting payment operation, generating, by an application side, a request for payment graphic code generation, the request carrying preset risk control features, and sending the request to a risk control side, wherein the risk control features at least include: a payment account feature of an account, a current location feature, and a station entering and exiting feature; after receiving the request for payment graphic code generation sent by the application side, obtaining, by the risk control side, pre-stored historical risk control features of the account according to the payment account feature in the request; detecting, by the risk control side, whether there is a transaction risk on the application side by comparing the obtained historical risk control features with the risk control features carried in the request, and returning a risk control detection result to the application side; and after receiving a result of no transaction risk returned by the risk control side, generating and displaying, by the application side, a payment graphic code. Detecting whether there is a transaction risk may include: determining whether a payment graphic code to be generated is used for station entering or station exiting according to the station entering and exiting feature; if it is determined that the payment graphic code to be generated is used for station entering, determining whether a frequency of the request for payment graphic code generation is higher than a preset threshold, and if so, determining that there is a transaction risk; and if it is determined that the payment graphic code to be generated is used for station exiting, determining whether the current location feature in the request for payment graphic code generation and a corresponding station entering location feature in the historical risk control features meet a preset location relation condition, and if not, determining that there is a transaction risk.

According to a fifth aspect of embodiments of the present specification, there is provided a payment risk control system including: an application side and a risk control side. The application side and the risk control side are configured to perform the method for payment risk control according to the fourth aspect.

According to a sixth aspect of embodiments of the present specification, there is provided a method for payment risk control, applied to an application side. The method includes: after receiving trigger of a station entering and exiting payment operation, generating a request for payment graphic code generation, the request carrying preset risk control features; sending the request for payment graphic code generation to a risk control side, so that the risk control side detects whether there is a transaction risk on the application side according to the risk control features carried in the request and returns a detection result, wherein the risk control features include: a payment account feature, a current location feature, and a station entering and exiting feature; and after receiving a result of no transaction risk returned by the risk control side, generating and displaying a payment graphic code.

According to a seventh aspect of embodiments of the present specification, there is provided a method for payment risk control method, applied to a risk control side. The method includes: after receiving a request for payment graphic code generation sent by an application side, obtaining pre-stored historical risk control features of the account according to a payment account feature in the request; and detecting whether there is a transaction risk on the application side by comparing the obtained historical risk control features with risk control features carried in the request, and returning a risk control detection result to the application side, wherein detecting whether there is a transaction risk includes: determining whether a payment graphic code to be generated is used for station entering or station exiting according to a station entering and exiting feature; if it is for station entering, determining whether a frequency of the request for payment graphic code generation is higher than a preset threshold, and if so, determining that there is a transaction risk; and if it is for station exiting, determining whether a current location feature and a corresponding station entering location feature in the historical risk control features meet a preset location relation condition, and if not, determining that there is a transaction risk.

According to the technical solutions provided by the embodiments of the present specification, for a scenario of electronic payment of public transportation fees, before a payment graphic code is generated on the application side, a transaction risk detection is performed on the application side to avoid public transportation payment by generating the graphic code in the presence of a transaction risk on the application side, thereby improving the security of users and payment institutions in this scenario.

It should be understood that the above general description and the following detailed description are only exemplary and explanatory, and do not limit the embodiments of the present specification.

BRIEF DESCRIPTION OF THE DRAWINGS

The accompanying drawings, which are incorporated in and constitute a part of the specification, illustrate embodiments consistent with the specification and, together with the description, serve to explain the principles of the specification.

DETAILED DESCRIPTION

Figure 1:
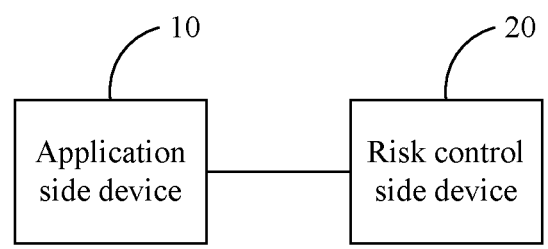
FIG. 1 is a schematic diagram of a payment risk control system according to an embodiment.

Embodiments will be described in detail here, examples of which are shown in the drawings. When the following description refers to the accompanying drawings, unless otherwise indicated, the same numerals in different drawings represent the same or similar elements. The implementations described in the following example embodiments do not represent all implementations consistent with the specification. Rather, they are only examples of apparatuses and methods consistent with some aspects of the specification as recited in the appended claims.

In embodiments of the present specification, a payment risk control process for a scenario of electronic payment of public transportation fees involves an application side and a risk control side.

The application side may be deployed on mobile terminal devices, such as users' smart phones, tablet computers, and other mobile terminal devices where applications can be installed. The application side may be applications such as e-wallet clients installed on the devices, so that users can conveniently pay public transportation fees through clients in mobile terminals they carry when they travel outdoors.

The risk control side may be deployed on a cloud server in the form of a cloud risk control side, and realize communication connection with the application side through various forms of wireless networks. The cloud server may be a specific server or server cluster.

In some embodiments, when the users take public transportation vehicles such as buses, subways, ferries, etc., the movement of the vehicles, or location in closed cars and underground and other factors may degrade quality of a network connection between the mobile terminal device and the cloud server, which affects real-time risk control of the payment process. Therefore, the risk control side may also be deployed in the form of a local risk control side on a local mobile terminal device where the application side is located, and be connected with the application side through a wired link in the terminal device. For example, a risk control software development kit (SDK) may be implanted in an e-wallet client.

The methods in the present specification can be implemented by the application side and the cloud risk control side, or by the application side and the local risk control side. The methods can also be implemented by combining the application side with the local risk control side and the cloud risk control side, which is not limited in the present specification.

FIG. 1 is a schematic diagram of a payment risk control system according to an embodiment. As shown in FIG. 1, the payment risk control system includes an application side device 10 and a risk control side device 20. The application side device 10 may be a mobile terminal device such as a smart phone or a tablet computer carried by a user, and the risk control side device 20 may be a cloud server or the mobile terminal device where the application side is located.

Figure 2:
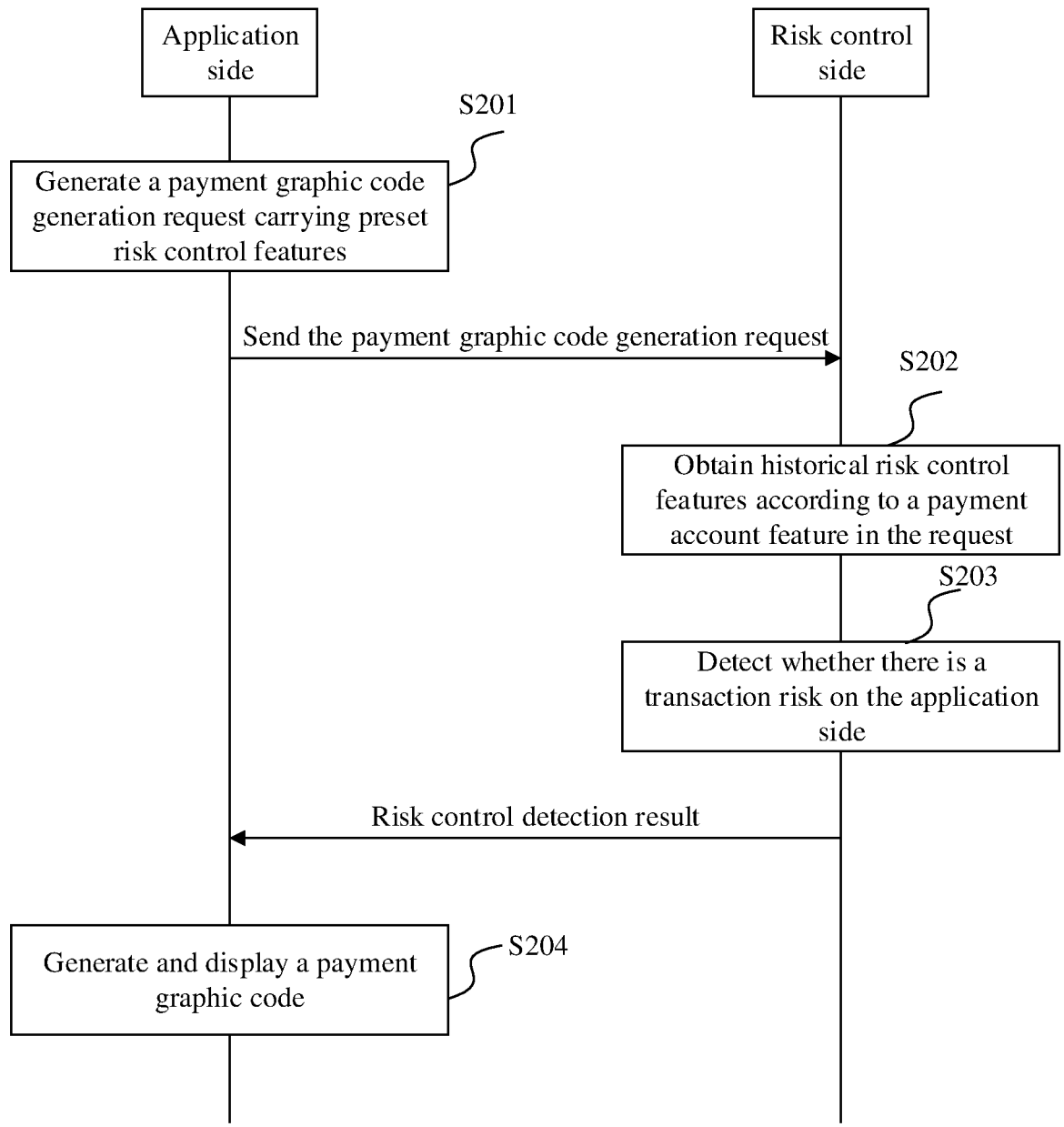
FIG. 2 is a flowchart of a payment risk control method according to an embodiment.

FIG. 2 is a flowchart of a payment risk control method according to an embodiment. Referring FIG. 2, the method may include the following steps.

In step S201, after receiving trigger of a station entering and exiting payment operation, an application side generates a payment graphic code generation request carrying preset risk control features, and sends the request to a risk control side, wherein the risk control features include: a payment account feature of an account, a current location feature, and a station entering and exiting feature.

In an embodiment, in a public transportation fee payment scenario, a user needs to perform a station entering and exiting payment operation on the application side when entering and exiting a station. For example, when passing station entering and exiting gates of a subway or getting on or off a bus or ferry, the user can turn on an e-wallet client (application side) installed in a mobile phone (application side device), and then perform operations such as clicking a button provided by the client to carry out the station entering and exiting payment operation. After receiving the trigger of the station entering and exiting payment operation, the application side may display a payment graphic code to pay the fee. A general payment graphic code may be generated by the application side or the risk control side. In the embodiment, the application side device may have poor network signals and consequently may not transmit data with the cloud risk control side through a wireless network. Therefore, in the embodiment, the payment graphic code is generated and displayed by the application side, and whether there is a transaction risk on the application side is detected before generating the graphic code so as to ensure the security of the payment process.

In an embodiment, a code reading device may be used to further detect whether an obtained payment graphic code is correct, whether it has been reused, or whether it has expired.

Accordingly, after receiving the trigger of the station entering and exiting payment operation, the application side generates the payment graphic code generation request carrying the preset risk control features and further sends the request to the risk control side.

In the embodiments of the present specification, in the case where the risk control side includes the cloud risk control side and the local risk control side, the cloud risk control side with better performance is preferably used for this payment risk control, but when it is not suitable to use the cloud risk control side due to poor quality of the wireless network connection between the application side and the cloud risk control side, a wired link is preferably used for communication, so the local risk control side with more stable data transmission performs this payment risk control.

For example, before sending the payment graphic code generation request by the application side, it is determined whether a current network signal of a mobile terminal where the application side is located has reached a preset strength. If so, it indicates that the current network signal is good, and the payment graphic code generation request may be sent to the cloud risk control side through the wireless network; and if not, it indicates that the current network signal is not good, it is not suitable to send data to the cloud risk control side, and the payment graphic code generation request may be sent to the local risk control side through the wired link.

In step S202, after receiving the payment graphic code generation request sent by the application side, the risk control side obtains pre-stored historical risk control features of the account according to the payment account feature in the request.

In step S203, the risk control side detects whether there is a transaction risk on the application side by comparing the obtained historical risk control features with the risk control features carried in the payment graphic code generation request, and returns a risk control detection result to the application side.

Whether there is a transaction risk on the application side may be detected through multiple methods according to various risk control features carried in the request sent by the application side and the historical risk control features.

In an embodiment, whether the payment graphic code to be generated is used for station entering or station exiting may be determined according to the station entering and exiting feature. If it is determined that the payment graphic code to be generated is for station entering, whether a frequency of the payment graphic code generation request is higher than a preset threshold is determined, and if so, it indicates that the frequency of station entering paid through this account is too high, and there may be risks such as account theft, maliciously sharing an account, etc., so it can be determined that there is a transaction risk. In addition, the time of this request and the time of each request in history may be further determined, and combined with the current location feature and a location feature of each request in history, whether the location change of each time of station entering is reasonable is determined, e.g., whether the location changes frequently, or whether the change distance is large within a short period of time, so whether there are risks of account theft, collusion, etc. is determined.

If it is determined that the payment graphic code to be generated is for station exiting, whether the current location feature and a corresponding station entering location feature in the historical risk control features meets a preset location relation condition is determined, and if not, it is determined that there is a transaction risk. For example, the time and location of station entering, the time and location of this time of station exiting, the running speed and route of used public transportation, and other information may be determined to determine whether the time and location of station exiting are reasonable so as to determine whether there are risks such as account theft and collusion.

In an embodiment, a pre-stored blacklist may also be obtained. Objects with transaction risks are recorded in the blacklist, and may be a payment account, user information (such as a name, an ID number, a mobile phone number, a bank card number, etc.) bound to the payment account, and/or device information (such as a mobile phone identification code, a currently used wireless hotspot, etc.) of the mobile terminal where the application side is located, and the risk control side may determine whether an object corresponding to the request is recorded in the blacklist according to the risk control features in the payment graphic code generation request.

In an embodiment, historical payment records of the payment account may also be obtained, and whether the account has risks is determined according to the historical payment records, so that whether there is currently a transaction risk on the application side is determined. For example, whether there is an unpaid amount, whether the payment amount is correct, whether there is a situation where the payment amount does not match the balance change, etc. may be determined.

In an embodiment, after receiving the payment graphic code generation request sent by the application side, the risk control side may also update the historical risk control features of the corresponding payment account by using the risk control features carried in the payment graphic code generation request, so as to subsequently detect the transaction risk according to the updated historical risk control features.

In an embodiment, the cloud risk control side and the local risk control side may synchronize data with each other to update locally stored historical records in time.

In step S204, after receiving a result of no transaction risk returned by the risk control side, the application side generates and displays a payment graphic code.

In an embodiment, the application side generates the payment graphic code only after receiving the result of no transaction risk returned by the risk control side. The result returned by the risk control side may also include a specific permission identification which is included in the payment graphic code generated by the application side, so that in subsequent further detection, the code reading device may determine whether the graphic code is generated when the risk control side determines that there is no transaction risk.

In an embodiment, besides real-time risk control in the process of generating and displaying the payment code on the application side, asynchronous data accumulation may also be performed between the application side and the risk control side, so that non-real-time risk control is performed on data of establishing a station entering and exiting payment service by a user and transaction settlement data, thereby realizing payment risk control on the application side in the whole payment process.

Figure 3:
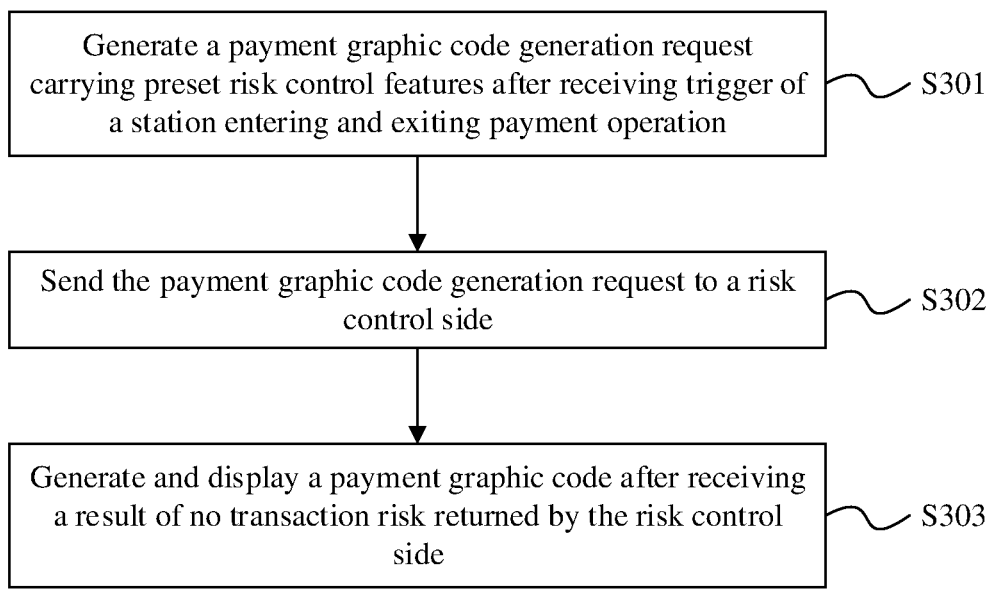
FIG. 3 is a flowchart of a payment risk control method according to an embodiment.

FIG. 3 is a flowchart of a payment risk control method executed on an application side according to an embodiment. Referring to FIG. 3, the method may include the following steps.

In step S301, after receiving trigger of a station entering and exiting payment operation, a payment graphic code generation request carrying preset risk control features is generated.

In step S302, the payment graphic code generation request is sent to a risk control side, so that the risk control side detects whether there is a transaction risk on the application side according to the risk control features carried in the request and returns a detection result.

The risk control features include: a payment account feature of an account, a current location feature, and a station entering and exiting feature.

In step S303, after receiving a result of no transaction risk returned by the risk control side, a payment graphic code is generated and displayed.

Figure 4:
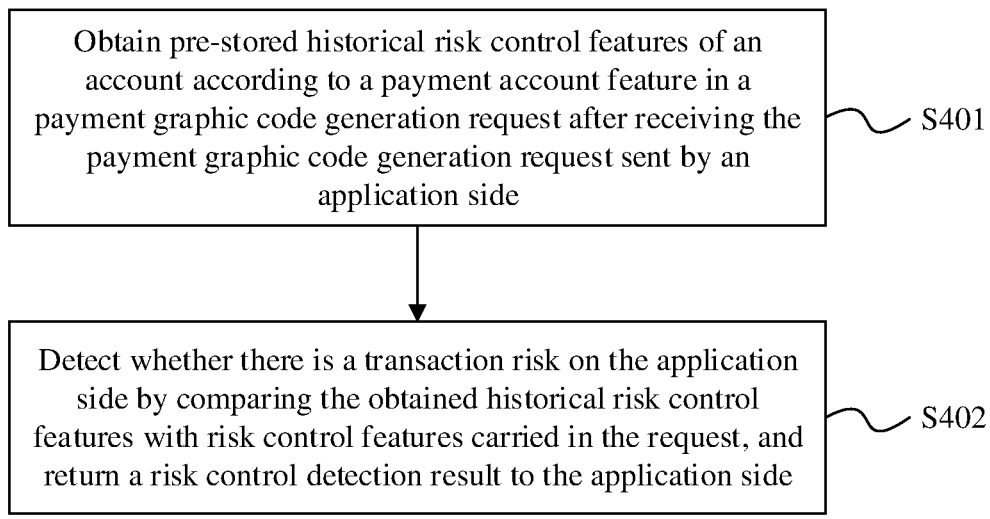
FIG. 4 is a flowchart of a payment risk control method according to an embodiment.

FIG. 4 is a flowchart of a payment risk control method executed on a risk control side according to an embodiment. Referring to FIG. 4, the method may include the following steps.

In step S401, after receiving a payment graphic code generation request sent by an application side, pre-stored historical risk control features of an account are obtained according to a payment account feature in the request.

In step S402, whether there is a transaction risk on the application side is detected by comparing the obtained historical risk control features with risk control features carried in the request, and a risk control detection result is returned to the application side.

In an embodiment, a method for detecting the transaction risk includes: determining whether a payment graphic code to be generated is used for station entering or station exiting according to a station entering and exiting feature; if it is for station entering, determining whether a frequency of the payment graphic code generation request is higher than a preset threshold, and if so, determining that there is a transaction risk; and if it is for station exiting, determining whether a current location feature and a corresponding station entering location feature in the historical risk control features meet a preset location relation condition, and if not, determining that there is a transaction risk.

In an embodiment, a payment risk control process for a scenario of electronic payment of public transportation fees can be divided into three stages: a service establishing stage, a payment graphic code generating stage, and a transaction settlement stage. Taking the payment of subway ride fees as an example, when the risk control side performs risk control, required input data may include: application side device information, current location information, a transaction account, balance change and payment history of the account, a blacklist of the risk control side, etc. According to the above input data, whether there are risks such as account theft, deduction failure, collusion, etc. are detected based on detection conditions such as whether it is in the blacklist, geographical location changes, payment frequency, balance changes, etc. Example embodiments are described below from the three stages.

Figure 5:
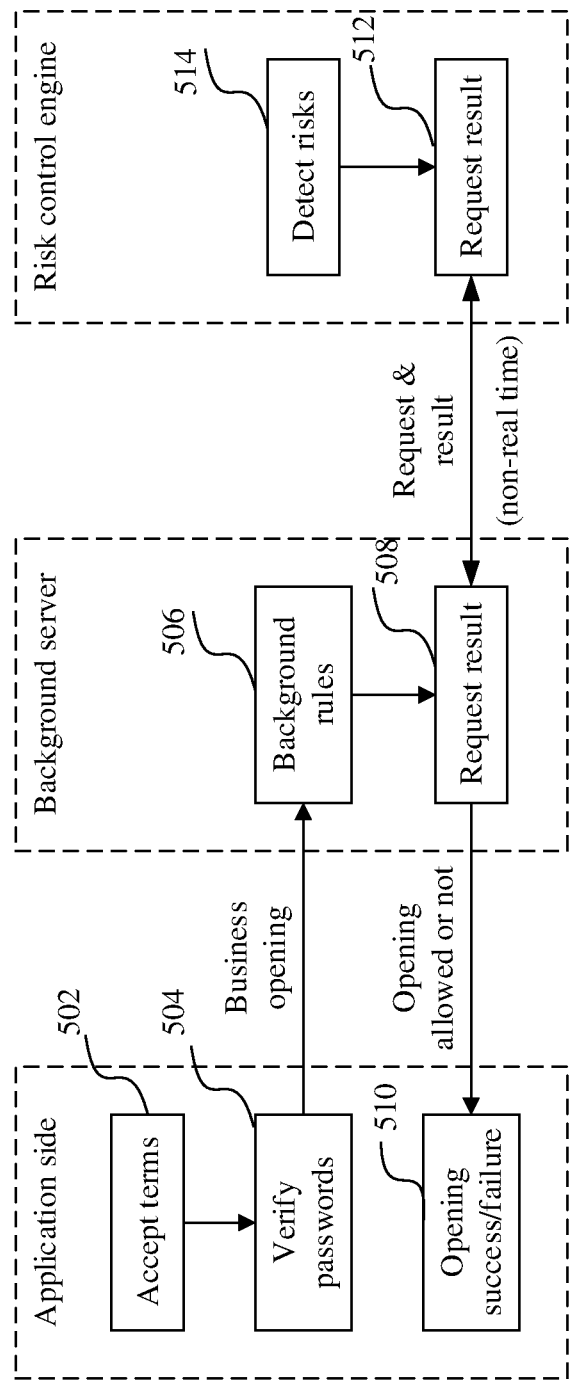
FIG. 5 is a schematic diagram of a service establishing stage according to an embodiment.

FIG. 5 is a schematic diagram of the service establishing stage according to an embodiment.

After a user installs an e-wallet client in a mobile phone, accepts agreement terms (502), and enters passwords for identity verification (504), the client (application side) sends a request to establish a station entering and exiting payment service to the risk control side. The risk control side may include a background server and a risk control engine of the e-wallet, and the request is first sent to the background server.

After receiving the request, the background server may perform relatively simple detection on the request based on preset rules (506), so as to determine whether to allow this establishing request (508), and return a result to the client (510). The preset rules may include risk detection rules, such as whether a credit value of the account meets the standard, and may also include other business rules, such as whether personal information of the user corresponding to the account meets the conditions.

The background server further sends the service establishing request and the processing result to the risk control engine (512), so that the risk control engine obtains the above input data, and detects whether there are risks of account theft, deduction failure, collusion, etc. based on the above detection conditions (514), and the process may be performed not in real time.

Figure 6:
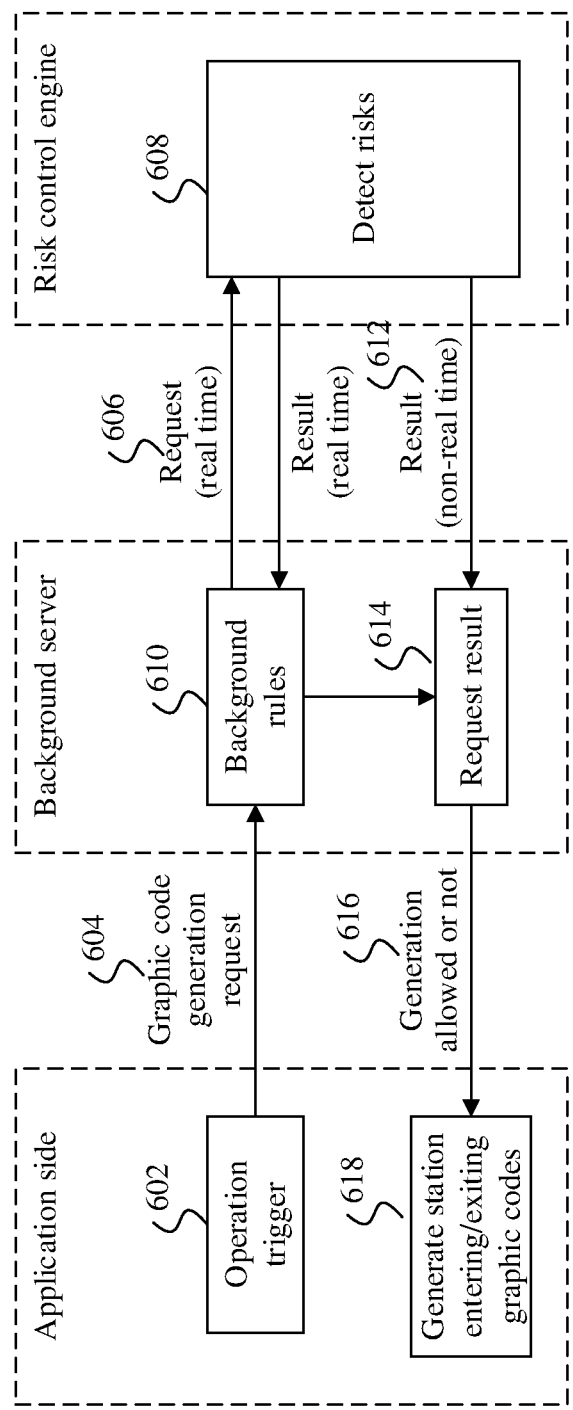
FIG. 6 is a schematic diagram of a payment graphic code generating stage according to an embodiment.

FIG. 6 is a schematic diagram of the payment graphic code generating stage according to an embodiment.

The user clicks a corresponding button in the client of the e-wallet, so that the client receives the trigger of the station entering and exiting payment operation (602) and sends the payment graphic code generation request (604) to the background server, and the background server forwards the request to the risk control engine (606), so that the risk control engine obtains the above input data and detects whether there are risks of account theft, deduction failure, collusion, etc. based on the above detection conditions (608). In addition, the background server may also perform relatively simple risk detection based on the preset rules (610).

The risk control engine returns the detection result to the background server (612). The background server combines risk detection performed at the local end to comprehensively make a decision on whether to allow the payment graphic code to be generated (614), and sends the decision to the client (616). After receiving the result that there is no transaction risk and the payment graphic code can be generated, the client generates and displays the payment graphic code used for entering and exiting subway station gates (618). The background server also sends the comprehensive processing result to the risk control engine for updating recorded related data. This process may be performed in non-real time.

Figure 7:
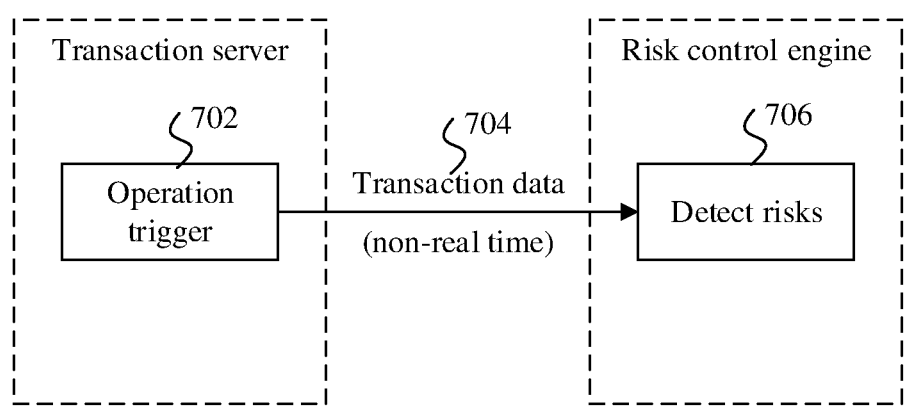
FIG. 7 is a schematic diagram of a transaction settlement stage according to an embodiment.

FIG. 7 is a schematic diagram of the transaction settlement stage according to an embodiment.

Based on an operation trigger (702), a transaction server may send transaction data (704) to the risk control engine in real time or not in real time, so that the risk control engine detects whether there are risks of account theft, deduction failure, collusion, etc. based on the above detection conditions according to the transaction data and data asynchronously accumulated in advance (706).

For the scenario of electronic payment of the public transportation fees, detection of transaction risk may be performed on the application side in real time before the payment graphic code is generated on the application side, to avoid public transportation payment by generating the graphic code in the presence of a transaction risk on the application side, thereby improving the security of users and payment institutions in this scenario.

In addition, for the situation of unstable network connecting quality in public transportation, the risk control side may be deployed in the mobile terminal device where the application side is located and connected to the application side through a wired link, and in the service establishing and transaction settlement stages, risk control is performed through asynchronous data accumulation, so that transaction risk detection can be performed in a more timely manner without affecting the normal use by the user, so as to provide a better payment risk control service.

The methods provided in the present specification may be applied to a risk control enabling scenario, that is, the risk control engine or risk control SDK is directly interfaced with an e-wallet that requires risk control so as to perform risk control at three stages of service application, payment graphic code generation, and transaction settlement. On the premise that the e-wallet's own system does not need to be significantly modified, the e-wallet can obtain the risk control capability, and there is no need to re-develop the risk control engine, thereby improving the utilization efficiency of human and material resources.

Corresponding to the above method embodiments, embodiments of the present specification further provide a payment risk control apparatus.

Figure 8:
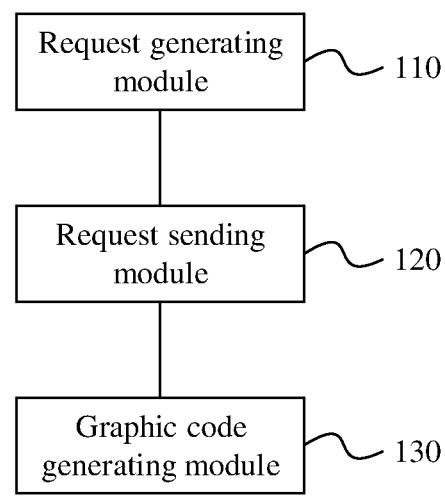
FIG. 8 is a schematic diagram of a payment risk control apparatus according to an embodiment.

FIG. 8 is a schematic diagram of a payment risk control apparatus applied to an application side according to an embodiment. As shown in FIG. 8, the apparatus may include: a request generating module 110 configured to generate a payment graphic code generation request carrying preset risk control features after receiving trigger of a station entering and exiting payment operation; a request sending module 120 configured to send the payment graphic code generation request to a risk control side, so that the risk control side detects whether there is a transaction risk on an application side according to the risk control features carried in the request and returns a detection result, wherein the risk control features include: a payment account feature of an account, a current location feature, and a station entering and exiting feature; and a graphic code generating module 130 configured to generate and display a payment graphic code after receiving a result of no transaction risk returned by the risk control side.

Figure 9:
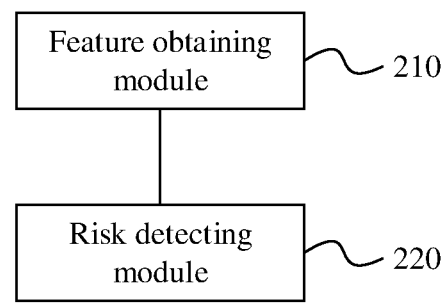
FIG. 9 is a schematic diagram of a payment risk control apparatus according to an embodiment.

FIG. 9 is a schematic diagram of a payment risk control apparatus applied to a risk control side according to an embodiment. As shown in FIG. 9, the apparatus may include: a feature obtaining module 210 configured to obtain pre-stored historical risk control features of an account according to a payment account feature of the account in a payment graphic code generation request sent by an application side after receiving the payment graphic code generation request; and a risk detecting module 220 configured to detect whether there is a transaction risk on the application side by comparing the obtained historical risk control features with risk control features carried in the request, and return a risk control detection result to the application side, In an embodiment, the risk detecting module 220 detects the transaction risk through the following method: determining whether a payment graphic code to be generated is used for station entering or station exiting according to a station entering and exiting feature; if it is for station entering, determining whether a frequency of the payment graphic code generation request is higher than a preset threshold, and if so, determining that there is a transaction risk; and if it is for station exiting, determining whether a current location feature and a corresponding station entering location feature in the historical risk control features meet a preset location relation condition, and if not, determining that there is a transaction risk.

Embodiments of the present specification further provide a device including a processor, and a memory storing instructions executable by the processor. The processor is configured to perform the above described payment risk control method, for example, including: after receiving trigger of a station entering and exiting payment operation, generating, by an application side, a payment graphic code generation request carrying preset risk control features, and sending the request to a risk control side, wherein the risk control features include: a payment account feature of an account, a current location feature, and a station entering and exiting feature; after receiving the payment graphic code generation request sent by the application side, obtaining, by the risk control side, pre-stored historical risk control features of the account according to the payment account feature in the request; detecting, by the risk control side, whether there is a transaction risk on the application side by comparing the obtained historical risk control features with the risk control features carried in the request, and returning a risk control detection result to the application side; and after receiving a result of no transaction risk returned by the risk control side, generating and displaying, by the application side, a payment graphic code.

Figure 10:
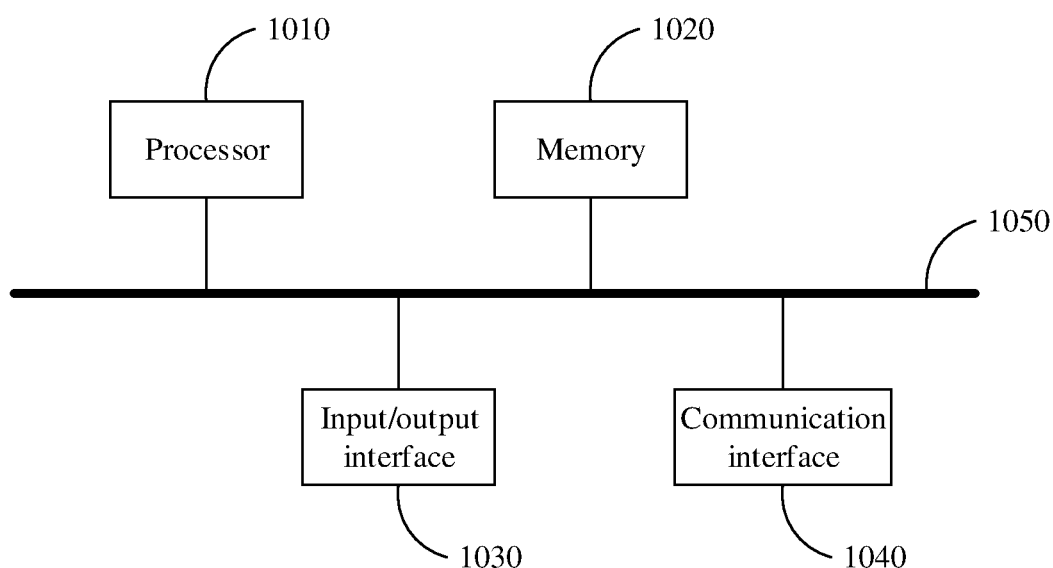
FIG. 10 is a schematic diagram of an apparatus for payment risk control according to an embodiment.

FIG. 10 is a schematic diagram of an apparatus for payment risk control according to an embodiment. The apparatus may include: a processor 1010, a memory 1020, an input/output interface 1030, a communication interface 1040, and a bus 1050. The processor 1010, the memory 1020, the input/output interface 1030, and the communication interface 1040 realize mutual communication connection in the apparatus through the bus 1050.

The processor 1010 may be a general-purpose central processing unit (CPU), a microprocessor, an application specific integrated circuit (ASIC), or one or more integrated circuits.

The memory 1020 may be a read only memory (ROM), a random access memory (RAM), a static storage device, a dynamic storage device, etc. The memory 1020 may store an operating system, instructions, and other application programs. The processor 1010 may execute the instructions to perform the above described methods.

The input/output interface 1030 is configured to be connected with an input/output module to realize information input and output. The input/output module may be configured as a component in the apparatus (not shown in the figure), or may also be externally connected to the apparatus to provide corresponding functions. An input device may include a keyboard, a mouse, a touch screen, a microphone, various sensors, etc., and an output device may include a display, a speaker, a vibrator, an indicator light, etc.

The communication interface 1040 is configured to be connected with a communication module (not shown in the figure) to implement communication interaction between the apparatus and other devices. The communication module may realize communication in a wired mode (such as a USB, a network cable, etc.), or in a wireless mode (such as a mobile network, WIFI, Bluetooth, etc.).

The bus 1050 includes an access and transmits information between all components (such as the processor 1010, the memory 1020, the input/output interface 1030, and the communication interface 1040) of the apparatus.

Those skilled in the art will understand that the components shown in FIG. 10 are for illustrative purpose only, and the apparatus may include more or fewer components than those shown in FIG. 10.

Embodiments of the present specification further provide a computer-readable storage medium having stored thereon instructions that, when executed by a processor of an apparatus, cause the apparatus to perform the above described payment risk control method, for example, including: after receiving trigger of a station entering and exiting payment operation, generating, by an application side, a payment graphic code generation request carrying preset risk control features, and sending the request to a risk control side, wherein the risk control features include: a payment account feature of an account, a current location feature, and a station entering and exiting feature; after receiving the payment graphic code generation request sent by the application side, obtaining, by the risk control side, pre-stored historical risk control features of the account according to the payment account feature in the request; detecting, by the risk control side, whether there is a transaction risk on the application side by comparing the obtained historical risk control features with the risk control features carried in the request, and returning a risk control detection result to the application side; and after receiving a result of no transaction risk returned by the risk control side, generating and displaying, by the application side, a payment graphic code.

The computer-readable storage medium includes permanent and non-permanent, removable and non-removable media, and can store information by any method or technology. The information may be computer-readable instructions, data structures, modules of programs, or other data. Examples of computer storage media include, but are not limited to, a phase change memory (PRAM), a static random access memory (SRAM), a dynamic random access memory (DRAM), other types of random access memories (RAM), read-only memories (ROM), electrically erasable programmable read-only memories (EEPROM), flash memories or other memory technologies, read-only compact disc read-only memories (CD-ROM), digital versatile disks (DVD) or other optical storage, magnetic tape cassettes, magnetic tape magnetic disk storage or other magnetic storage devices, or any other non-transmission media, and the computer storage media can be used to store information that can be accessed by computing devices. The computer-readable media do not include transitory computer-readable media, such as modulated data signals and carrier waves.

In some embodiments, the above described methods can be implemented by means of software plus a general hardware platform, such as in the form of software products. The software products can be stored in a storage medium, such as ROM/RAM, magnetic disks, optical disks, etc., and include a plurality of instructions to enable a computer device (which may be a personal computer, server, or network device) to perform the methods described above.

The system, apparatus, module, or unit explained in the above embodiments may be implemented by a computer chip or entity, or implemented by a product having a certain function. A typical implementation device is a computer, including a personal computer, a laptop computer, a cellular phone, a camera phone, a smart phone, a personal digital assistant, a media player, a navigation device, an email sending and receiving device, a game console, a tablet computer, a wearable device, or a combination of any of these devices.

The apparatus embodiments described above are only schematic, wherein the modules described as separate components may or may not be physically separated, and the functions of the modules may be implemented in the same or multiple pieces of software and/or hardware. Part or all of the modules may also be selected according to actual needs.

Although the present specification has been described with reference to the embodiments, those of ordinary skills in the art will understand that the present specification has many variations and changes without departing from the spirit of the present specification, and the appended claims cover these variations and changes.

The invention claimed is:

1. A method for payment risk control, the method being performed by a mobile terminal device and comprising:
   receiving trigger of a station entering and exiting payment operation on the mobile terminal device;
   in response to receiving the trigger, determining whether a current network signal of the mobile terminal device reaches a preset strength, and determining, based on the preset strength, whether to send a request for payment graphic code generation to a cloud server or to an application locally installed on the mobile terminal device;
   in response to a determination that the current network signal reaches the preset strength, sending the request for payment graphic code generation to the cloud server, wherein the mobile terminal device is connected with the cloud server through a wireless network;
   in response to a determination that the current network signal does not reach the preset strength, sending, to the application locally installed on the mobile terminal device, the request for payment graphic code generation, the request carrying preset risk control features, the risk control features including a payment account feature of an account, a current location feature, and a station entering and exiting feature;
   obtaining pre-stored historical risk control features of the account according to the payment account feature in the request;
   detecting whether there is a transaction risk for the mobile terminal device by comparing the obtained historical risk control features with the risk control features carried in the request, wherein detecting whether there is a transaction risk comprises:
     determining whether to generate a payment graphic code for station entering or station exiting according to the station entering and exiting feature;
     in response to a determination to generate the payment graphic code for station entering, determining whether a frequency of the request for payment graphic code generation is higher than a preset threshold, and if so, determining that there is a transaction risk; and in response to a determination to generate the payment graphic code for station exiting, determining whether the current location feature in the request for payment graphic code generation and a corresponding station entering location feature in the historical risk control features meet a preset location relation condition, and if not, determining that there is a transaction risk; and after receiving a risk control detection result indicating no transaction risk, generating and displaying the payment graphic code on the mobile terminal device.

2. The method according to claim 1, further comprising:
updating the historical risk control features of the account with the risk control features carried in the request for payment graphic code generation, for subsequent detection of transaction risk according to the updated historical risk control features.

3. The method according to claim 1, wherein detecting whether there is a transaction risk further comprises:
obtaining a pre-stored blacklist; and
determining whether objects with transaction risks recorded in the blacklist comprise an object corresponding to the request for payment graphic code generation, according to the risk control features in the request for payment graphic code generation,
wherein the object comprises at least one of: a payment account, user information bound to the payment account, or device information of the mobile terminal device.

4. A mobile terminal device for payment risk control, comprising:
a processor; and
a memory storing instructions executable by the processor;
wherein the processor is configured to:
receive trigger of a station entering and exiting payment operation on the mobile terminal device;
in response to receiving the trigger, determine whether a current network signal of the mobile terminal device reaches a preset strength, and determine, based on the preset strength, whether to send a request for payment graphic code generation to a cloud server or to an application locally installed on the mobile terminal device;
in response to a determination that the current network signal reaches the preset strength, send the request for payment graphic code generation to the cloud server, wherein the mobile terminal device is connected with the cloud server through a wireless network;
in response to a determination that the current network signal does not reach the preset strength, send, to the application locally installed on the mobile terminal device, the request for payment graphic code generation, the request carrying preset risk control features, the risk control features including a payment account feature of an account, a current location feature, and a station entering and exiting feature;
obtain pre-stored historical risk control features of the account according to the payment account feature in the request;
detect whether there is a transaction risk for the mobile terminal device by comparing the obtained historical risk control features with the risk control features carried in the request, wherein detecting whether there is a transaction risk comprises:

determining whether to generate a payment graphic code for station entering or station exiting according to the station entering and exiting feature;

in response to a determination to generate the payment graphic code for station entering, determining whether a frequency of the request for payment graphic code generation is higher than a preset threshold, and if so, determining that there is a transaction risk; and in response to a determination to generate the payment graphic code for station exiting, determining whether the current location feature in the request for payment graphic code generation and a corresponding station entering location feature in the historical risk control features meet a preset location relation condition, and if not, determining that there is a transaction risk; and after receiving a risk control detection result indicating no transaction risk, generate and display the payment graphic code on the mobile terminal device.

5. The mobile terminal device according to claim 4, wherein the processor is further configured to:
update the historical risk control features of the account with the risk control features carried in the request for payment graphic code generation, for subsequent detection of transaction risk according to the updated historical risk control features.

6. The mobile terminal device according to claim 4, wherein in detecting whether there is a transaction risk, the processor further configured to:
obtain a pre-stored blacklist; and
determine whether objects with transaction risks recorded in the blacklist comprise an object corresponding to the request for payment graphic code generation, according to the risk control features in the request for payment graphic code generation,
wherein the object comprises at least one of: a payment account, user information bound to the payment account, or device information of the mobile terminal device.

7. A non-transitory computer-readable storage medium having stored thereon instructions that, when executed by a processor of a mobile terminal device, cause the mobile terminal device to perform a method for payment risk control, the method comprising:
receiving trigger of a station entering and exiting payment operation on the mobile terminal device;
in response to receiving the trigger, determining whether a current network signal of the mobile terminal device reaches a preset strength, and determining, based on the preset strength, whether to send a request for payment graphic code generation to a cloud server or to an application locally installed on the mobile terminal device;
in response to a determination that the current network signal reaches the preset strength, sending the request for payment graphic code generation to the cloud server, wherein the mobile terminal device is connected with the cloud server through a wireless network;
in response to a determination that the current network signal does not reach the preset strength, sending, to the application locally installed on the mobile terminal device, the request for payment graphic code generation, the request carrying preset risk control features, the risk control features including a payment account feature of an account, a current location feature, and a station entering and exiting feature;

obtaining pre-stored historical risk control features of the account according to the payment account feature in the request;

detecting whether there is a transaction risk for the mobile terminal device by comparing the obtained historical risk control features with the risk control features carried in the request, wherein detecting whether there is a transaction risk comprises:
  determining whether to generate a payment graphic code for station entering or station exiting according to the station entering and exiting feature;
  in response to a determination to generate the payment graphic code for station entering, determining whether a frequency of the request for payment graphic code generation is higher than a preset threshold, and if so, determining that there is a transaction risk; and
  in response to a determination to generate the payment graphic code for station exiting, determining whether the current location feature in the request for payment graphic code generation and a corresponding station entering location feature in the historical risk control features meet a preset location relation condition, and if not, determining that there is a transaction risk; and after receiving a risk control detection result indicating no transaction risk, generating and displaying the payment graphic code on the mobile terminal device.

8. The non-transitory computer-readable storage medium according to claim 7, the method further comprising:
  updating the historical risk control features of the account with the risk control features carried in the request for payment graphic code generation, for subsequent detection of transaction risk according to the updated historical risk control features.

9. The non-transitory computer-readable storage medium according to claim 7, wherein detecting whether there is a transaction risk further comprises:
  obtaining a pre-stored blacklist; and
  determining whether objects with transaction risks recorded in the blacklist comprise an object corresponding to the request for payment graphic code generation, according to the risk control features in the request for payment graphic code generation,
  wherein the object comprises at least one of: a payment account, user information bound to the payment account, or device information of the mobile terminal device.

* * * * *